July 30, 1940.    M. H. LOUGHRIDGE ET AL    2,209,342
SELECTIVE PHOTOGRAPHING SYSTEM
Filed Oct. 1, 1937
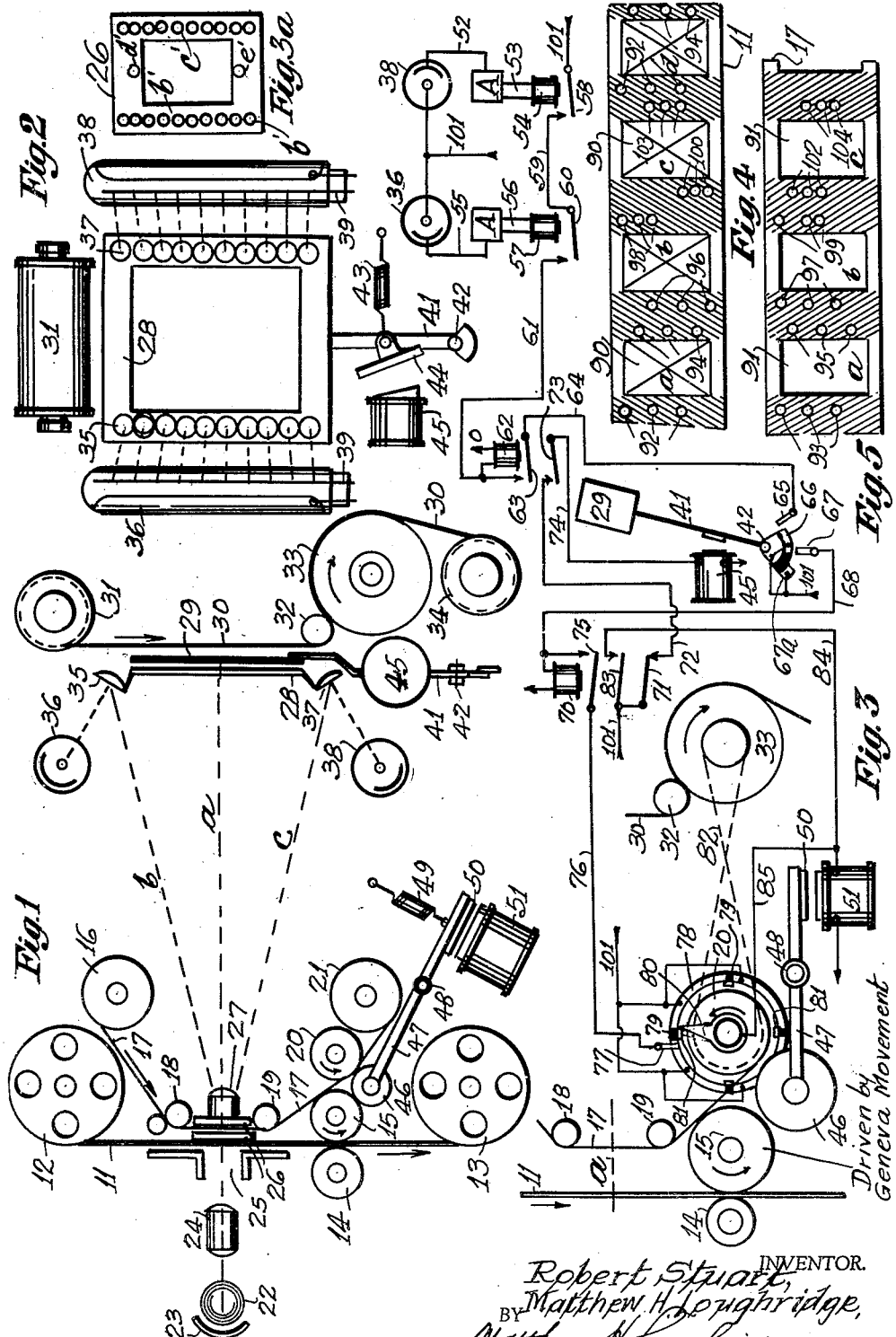
INVENTOR.
Robert Stuart,
BY Matthew H. Loughridge,
Matthew H. Loughridge
ATTORNEY.

Patented July 30, 1940

2,209,342

UNITED STATES PATENT OFFICE 2,209,342

SELECTIVE PHOTOGRAPHING SYSTEM

Matthew H. Loughridge, Bogota, N. J., and Robert Stuart, Forest Hills, Long Island, N. Y.

Application October 1, 1937, Serial No. 166,720

31 Claims. (Cl. 88—24)

This invention relates to a selective photoprinting system and the apparatus used in connection therewith and it has for an object to selectively print enlargements from any frame of a photographic film; to provide each frame of the film with distinctive markings for selective purposes; to provide a control film or band having markings arranged in a predetermined order on the film to register with the markings of the picture film for selective purposes; to provide light sensitive means responsive to the markings of the films when they come into register for controlling the system; to provide a control film or band with predetermined markings which are progressively brought into use for selecting the frames of the film desired; to provide for projecting the picture of the film and the markings of the film through the same gate with light cells responsive to the film markings only and to provide a selectively operated shutter mechanism controlling the projection of the picture but not the light to the light cells.

These and other objects of the invention will be more particularly understood from the following specification and the accompanying drawing, in which:

Fig. 1 is a diagram of a projector with the selective apparatus added thereto;

Fig. 2 is a diagram of the screen with the paper feed roller and light cells;

Fig. 3 is a diagram of the operating circuit used with Fig. 1;

Fig. 3a is a front view of the gate used with Fig. 1;

Fig. 4 is a portion of picture film with the selective markings thereon;

Fig. 5 is a portion of the control film with the selective markings thereon.

This invention relates to the same general type of machine as disclosed in application, Serial No. 92,271 of July 24, 1936, and 154,974 of July 22, 1937. The invention may be adapted for a variety of purposes but it is particularly considered in connection with photographic records of indices, documents or books, in which the record is made on a film and stored away until called for. In practice a single film may have a hundred thousand frames and it may be desirable to obtain enlarged prints of only a few of these frames located at different positions on the film. The selective arrangement of the invention enables prearranged combinations to be applied to the film so that the system will produce the print desired as it is run through the projector once and it will not take any other prints.

For this purpose each frame of the film is provided with a series of marks which may be arranged to correspond with serial numbers, these marks being placed around the edge of the frame and are preferably made so that light may be projected through an opaque portion of the film corresponding to the marks. This gives a distinguishing number to each frame and by which the frame is selected. A control film, preferably of the same size as the picture film, but which may be made from any opaque substance is arranged to pass through the gate of the projector parallel with the picture film. This control film is provided with prearranged clear spots through which the light may be projected. It may also be provided with an aperture opposite the opening of the projector through which the picture is projected. Three light apertures are arranged in line on the picture film and three light apertures are arranged in line on the control film and when all of these apertures register the maximum light effect is transmitted to a light cell for selectively operating the system. If less than three of the apertures register the light transmitted to the light cell is not sufficient to operate the system. A plurality of light cells may be used for controlling the system and which provide an extensive system of selection.

In order that a large number of different selections may be obtained as the film is passed through the projector, the control film is also fed through the projector, each frame of this film producing a different selection. The control film remains in the gate of the projector until a condition of synchronism is produced with the picture film when the apparatus is operated to make the print and then to move the control film forward one frame so that it may be in position to produce the next selection desired.

As the system is inoperative except when a print is to be made, the film moves idly through the projector mechanism with the shutter closed until a condition of synchronism is produced. The light cells then operate to open the shutter and make the exposure, after this the paper feed mechanism moves forward to the new position and the feed roller of the control film is connected with the feed of the picture film so that it moves forward one frame for the next operation.

*Picture film and control film*

In Fig. 1, 11 is the motion picture film with the picture subjects thereon which is supplied from the feed reel 12 and taken up on the reel 13 by the usual take-up mechanism, not shown in the drawing. The film passes between the roller 14 and the sprocket roller 15 which engages the apertures of the film and is operated by the usual Geneva movement in which the film is moved forward for one-quarter of the cycle of operation and remains stationary for three-quarters of the cycle as is usually provided in projecting machines.

The control film 17 is taken off the reel 16, passes over the roller 18, through gate 26, and over the roller 19 and the sprocket 20 to the take-up reel 21. The sprocket 20 feeds the control film forward intermittently and corresponding to the movement of the picture film 11 but controlled by the selective mechanism hereinafter described.

Optical system

The optical system comprises the source of illumination 22 with the reflector 23, the condenser lens 24 projecting through the aperture 25 on the axis $a$ through the gate 26 and the projector lens 27 upon the screen 28. For photographing enlargements of the picture subjects on the film, a roll of sensitized paper 31 is provided, with the paper extending at 30 behind the aperture in the screen 28, over the roller 32 and over the feed roller 33 to the take-up roller 34. Between the screen 28 and the paper 30 the shutter 29 is interposed and is mounted on an arm 41, pivoted at 42 and normally held in the closed position by the spring 43. When the magnet 45 is energized the armature 44, mounted on 41, is attracted and the screen is thereby "flipped" to the open position to make a rapid exposure of the subject on the frame of the film whereby an enlargement of this subject is printed on the portion of the paper roll exposed behind the screen 28.

The selection of the system is obtained by the use of a pair of photo-electric cells which are arranged to be influenced by the amount of light transmitted through predetermined clear or transparent spots on the film 11 and in the control film 17 when they come into register. This light is separated from the light on the axis of the system $a$ that is used for printing the picture and may be arranged at the sides as indicated by $b$ and $c$. The light transmitted through the apertures indicated by $b$ is directed to a row of reflectors 35, Fig. 2, and these reflectors reflect the light upon the photo-electric cell 36. This light is deflected from the path of the light beam used for printing the picture. A corresponding arrangement is provided at the opposite side in which the light beam $c$ falls upon one or more of a row of reflectors 37 and from these reflectors falls upon the photo-electric cell 38 and influences the cathode 39 thereof to control a circuit corresponding with the amount of light that is reflected upon the cell.

Feed of control film

Normally the film 11 is fed intermittently through the projector mechanism by the movement of roller 15, but the roller 20 remains stationary and the film 17 is not moved except when a change in the selection is to be made. This change is effected by means of magnet 51, which, when energized, attracts armature 50 against spring 49 and moves the lever 47, pivoted at 48, and carrying the friction roller 46 into engagement with 15 and 20 so that the movement of 15 is transmitted to 20 which moves to the same extent and at the same time as the film 11 is moved provided magnet 51 is energized. A front view of the gate 26 is illustrated in Fig. 3a which has a central aperture for the beam of light for the picture corresponding to the size of the frame and it has a row of apertures $b'$ on one side, and another row $c'$ on the opposite side corresponding to the maximum number of light transmitting portions or spots in the picture film and in the control film 17 at any frame of these films. It is also provided with apertures $d'$ and $e'$ for further selective operation.

The picture film, Fig. 4, is provided with the usual frame 90 for the picture subject and it is provided with three light transmitting portions in a predetermined location on both sides of the frame. A reflector 35, Fig. 2, is provided for the maximum number of these light transmitting portions on one side of the frame and a corresponding reflector 37 is provided for the light transmitting portions on the opposite side of the frame. The arrangement in Fig. 2 indicates that ten of these reflectors are provided in each row and when any three of them are illuminated the light is then sufficient to energize the photoelectric cell so that it controls the operating circuits. Light from less than three of these reflectors will not sufficiently energize the photoelectric cell to operate the system. Each of the frames of the film in Fig. 4 are provided with three of these light transmitting areas so that if all these areas are open and transmitting light at the same time each photo-electric cell will be properly energized to control the system. On the other hand, if one or more of these light transmitting areas is obstructed, as for instance by the control film, the system is not operated.

Selective film

The control film 17, Fig. 5, determines the number of spots and their location on film 11 which may transmit the light to the photo cell. It will be noted that when frame $a$ of the film 11 is opposite frame $a$ of film 17 the light spots 92 and 93 coincide both in number and in position. This will result in energizing one of the photocells; also the light spots 94 coincide with the light spots 95 in number and position and this, in turn, will energize the other light cell and when this condition occurs the system is said to be synchronized and a selective operation takes place. When frame $b$ of the film 11 registers with frame $b$ of the film 17, only one of the light spots in the row 96 registers with the light spots 97 which is insufficient to operate the photo-cell. Also, two of the light spots in row 98 register with the light spots in row 99 and this is insufficient to operate the light cell. In the same way it will be noted that the light spots in the frame $c$ of film 11 in row 100 do not register with the row 102 in 17, while the light spots in the opposite side in row 103 register with 104 and this will operate one of the light cells but will not synchronize the system.

If the film 11 is fed forward past the film 17 with the frame $a$ stationary in the gate of the projector, it is apparent that synchronism will occur when frames $a$ and $d$ of film 11 register with this frame of the control film and only frames in film 11 having corresponding light spots will synchronize the system as long as frame $a$ of the control film remains in the gate. It is also apparent that if the film 17 is changed after it is once synchronized with the picture film so that the frame $b$ remains stationary in the gate, then the system will not synchronize until a frame on film 11 having corresponding light spots to this frame registers with it.

One of the objects of the system is to take a film that may have several thousand subjects photographed thereon and to run this film through the projecting apparatus and select therefrom predetermined frames from which photograph enlargements are desired. Each frame of the film is distinguished by three or more light spots selected from a group of ten and which may be provided on all four sides of the frame if necessary. The control film 17 is then made up, preferably of some opaque material, with a suitable aperture for the light of the picture and perforated with perforations located to register with the particular frame of the film desired. These perforations may be arranged according to a code as hereinafter described. The control film is prepared before the machine is started and any number of frames may be prepared in the control film and thus the selections are predetermined and prearranged to be used progressively in the operation of the machine so that a group of different selections can be obtained from the film by running it once through the projector.

Controlling circuits

The controlling circuits are illustrated in the diagram in Fig. 3 in which the photo-cell 36, through wire 55, amplifier A and circuit 56 energizes relay 57 from the energy source 101 when a condition of synchronism supplies the proper light to cell 36. In the same way cell 38, through wire 52, amplifier A and circuit 53 energizes relay 54. When relays 54 and 57 are energized the system is synchronized and a circuit is established from the energy wire 101 through contact 58, wire 59, contact 60 and wire 61 to pick up the stick relay 62, the return circuit being indicated by the arrow point at o. The shutter magnet 45 is energized from the energy wire 101, contact 71 of relay 70 in the deenergized position, wire 72, contact 73 of relay 62 energized and wire 74 to magnet 45. Magnet 45 opens the shutter 29 and as the shutter is moved towards the open position a circuit is established from 101, through contact 66 to contact finger 65 and wire 64 to contact finger 63 and to relay 62, forming the stick circuit for this relay and insuring that once relay 62 has been energized by the photocells that the shutter makes a complete movement even if the photo-cells should interrupt the circuit before this movement is completed. When the shutter reaches its open position a circuit is established from energy wire 101 through contact 67a to contact finger 67 and wire 68 which picks up the stick relay 70 and interrupts the circuit of the shutter magnet 45 at 71 so that the shutter cannot be operated a second time after relay 70 is energized. This closes the shutter by deenergizing magnet 45. When relay 70 is energized a stick circuit is established through its contact 75, wire 76, contact finger 77 to one of the quadrants 78, connected with the source of energy 101 and mounted on the shaft of roller 20 so that relay 70 remains energized until the roller 20 has made one-quarter of a revolution which brings a new frame of the control film into position. When the quarter revolution is completed the contact finger 77 engages one of the insulated sections 79 and interrupts the holding circuit and thereby deenergizes relay 70.

The magnet 51 is energized from the energy wire 101, through contact 83 of relay 70 in the energized position and wire 84 to magnet 51. This magnet brings the friction roller 46 into engagement with 15 and 20 so that when the Geneva movement rotates the roller 15 the roller 20 is rotated at the same time and to the same extent.

It will be noted that as soon as the control film or the picture film 11 starts to move the light used to energize the photo-cells is interrupted and it is necessary, after the selection is initiated by the photo-cells to complete the movement of the control film. This is the purpose of the stick relay 70 which when once energized remains energized until roller 20 has made a one-quarter turn. When the contact finger 77 engages the insulation 79 the relay 70 is deenergized, but in order that this contact finger may not remain in this position a shunt circuit is provided for magnet 51 through wire 85 to the stationary contact fingers 80 which engages a projection 81 connected with the source of energy and opposite the insulation 79 thereby holding the circuit of magnet 51 until this contact finger has passed 81 and interrupted the circuit.

The paper feed mechanism may be operated by the belt 82 connecting roller 20 with the paper feed roller 33 which is so proportioned that a fresh portion of paper is moved opposite the aperture of screen 28 during the movement of the film which occurs when the shutter is closed.

Operation

In the operation of the system described it should be observed that the film moves through the projector from reel 12 to reel 13 until a frame synchronizes with the exposed frame of the control film. At this point and during the rest period of the film the photo-cells are energized and the shutter is opened to print the subject of the frame upon the paper already in position behind the shutter. The shutter then closes and the feed for the control film is connected with the feed of the picture film so that as the picture film moves forward to expose another frame the control film is moved forward to a new frame and another portion of the printing paper is positioned for the next exposure which will not occur until another frame of the film synchronizes with a new frame of the control film. The shutter 29 is arranged to shut off the light for printing the picture without interrupting the light to the photo-cells. Where the light for the photo-cells is obtained from a different portion of the picture film the shutter can then operate to control the printing projection in the usual way.

It should be noted that if the film has the same combinations of light spots repeating at intervals and it was desired merely to select out prints having these combinations, then a single selection frame of the control film will secure the results, this film being removed from the feed control by disconnecting magnet 51 or otherwise cutting off the feed.

The selective arrangement operates by the arrangement of the light spots on the film and on the control film exposed at the same time and does not depend upon any previous condition.

The drawing shows the system and apparatus in diagram form and not the actual construction of the apparatus which is adapted from standard practice.

The film may have the markings printed thereon from a superimposed master film having the markings arranged according to the code.

The control film is superimposed upon the picture film and corresponds with it in shape. The apparatus, however, will operate with any system of selection that it may be convenient to use:

The arrangement of selection by the position of three light spots in ten rows, as indicated in Figs. 3a and 4 may be arranged for numerical application according to the following code:

| No. | Position | No. | Position | No. | Position | No. | Position | No. | Position |
|---|---|---|---|---|---|---|---|---|---|
| 1 | 012 | 11 | 025 | 21 | 039 | 31 | 067 | 41 | 127 |
| 2 | 013 | 12 | 026 | 22 | 045 | 32 | 068 | 42 | 128 |
| 3 | 014 | 13 | 027 | 23 | 046 | 33 | 069 | 43 | 129 |
| 4 | 015 | 14 | 028 | 24 | 047 | 34 | 078 | 44 | 134 |
| 5 | 016 | 15 | 029 | 25 | 048 | 35 | 079 | 45 | 135 |
| 6 | 017 | 16 | 034 | 26 | 049 | 36 | 089 | 46 | 136 |
| 7 | 018 | 17 | 035 | 27 | 056 | 37 | 123 | 47 | 137 |
| 8 | 019 | 18 | 036 | 28 | 057 | 38 | 124 | 48 | 138 |
| 9 | 023 | 19 | 037 | 29 | 058 | 39 | 125 | 49 | 139 |
| 10 | 024 | 20 | 038 | 30 | 059 | 40 | 126 | 50 | 145 |

| No. | Position | No. | Position | No. | Position | No. | Position | No. | Position |
|---|---|---|---|---|---|---|---|---|---|
| 51 | 146 | 61 | 169 | 71 | 245 | 81 | 268 | 91 | 356 |
| 52 | 147 | 62 | 178 | 72 | 246 | 82 | 269 | 92 | 357 |
| 53 | 148 | 63 | 179 | 73 | 247 | 83 | 278 | 93 | 358 |
| 54 | 149 | 64 | 189 | 74 | 248 | 84 | 279 | 94 | 359 |
| 55 | 156 | 65 | 234 | 75 | 249 | 85 | 289 | 95 | 367 |
| 56 | 157 | 66 | 235 | 76 | 256 | 86 | 345 | 96 | 368 |
| 57 | 158 | 67 | 236 | 77 | 257 | 87 | 346 | 97 | 369 |
| 58 | 159 | 68 | 237 | 78 | 258 | 88 | 347 | 98 | 378 |
| 59 | 167 | 69 | 238 | 79 | 259 | 89 | 348 | 99 | 379 |
| 60 | 168 | 70 | 239 | 80 | 267 | 90 | 349 | 100 | 389 |

Having thus described our invention, we claim:

1. A selective photo-printing system comprising a film with frames having picture subjects and a plurality of groups of markings for each frame, a drive for said film, a control film having a plurality of markings for each group registering with the markings of the film, means connecting said control film with said film drive for changing the displayed markings of said control film after each operation, light responsive means, means for projecting the registered markings of said films upon said light responsive means and a printing mechanism for the picture operated by said light responsive means.

2. A selective photo-printing system comprising a film with frames having picture subjects and a plurality of groups of markings for each frame, a drive for said film, a control film having a plurality of markings for each group registering with the markings of the film, light responsive means, means for projecting the registered markings of said films upon said light responsive means, a printing mechanism for the picture operated by said light responsive means and means connecting said control film with said film drive for changing the display of said control film after a printing operation.

3. A selective photo-printing system comprising a film with frames having picture subjects and a plurality of groups of markings for each frame, a projector through which said film is fed for printing purposes, a control film having frames with different markings for each group in said projector, said projector including a drive for said control film to change its display, light responsive means, means for projecting the registered markings of said films upon said light responsive means and a printing mechanism for the picture subject operated by said light responsive means when predetermined markings on said films register.

4. A selective photo-printing system comprising a film with frames having picture subjects and a plurality of groups of markings for each frame, a projector through which said film is fed for printing purposes, a control film having frames with different markings in said projector, light responsive means, means for projecting the registered markings of said films upon said light responsive means, a printing mechanism for the picture subject and means in said projector for changing the projected frame of the control film by said light responsive means.

5. A selective photo-printing system comprising a film with frames having picture subjects and a plurality of groups of markings for each frame, a projector through which said frame is fed for printing purposes, a control film having frames with different markings on said projector, light responsive means, means for projecting the registered markings of said films upon said light responsive means, a feed roller for said control film and means operatively connecting said feed roller with the feed of the picture film and controlled by said light responsive means.

6. A selective photo-printing system comprising a film with frames having picture subjects and markings for each frame, a projector through which said frame is fed for printing purposes, a control film having frames with different markings in said projector, light responsive means, means for projecting the registered markings of said films upon said light responsive means, a feed roller for said control film, a friction wheel brought into engagement with said feed roller and the feed of the picture film and a magnet controlling said friction wheel and controlled by said light responsive means.

7. A selective photo-printing system comprising a film with frames having picture subjects and markings for each frame, a projector through which said film is fed for printing purposes, a shutter for said projector, a control film having markings to register with the markings of the film, means for feeding said control film with the picture film, light responsive means, means for projecting the registered markings of said films on said light responsive means and said light responsive means controlling the operation of said shutter and said feeding means for the control film.

8. A selective photo-printing system comprising a film with frames having picture subjects and markings for each frame, a projector through which said film is fed for printing purposes, a shutter for said projector, a control film having markings to register with the markings of the film, a paper feed mechanism controlled by said shutter, light responsive means, means for projecting the registered markings of said film on said light responsive means and said light responsive means controlling the operation of the shutter and changing said control film to bring different markings into register.

9. A selective photo-printing system comprising a film with frames having picture subjects and groups of individual markings for each frame, a control film having markings to register with the markings of the film, means for moving the film and means for cooperatively moving the control film, a plurality of light sensitive devices, means for projecting light on said devices in accordance with said markings, said device controlling the processing of the projected picture of said film when energized by the projected light and controlling the cooperative movement of the control film.

10. A selective photo-printing system comprising a film with frames having picture subjects and marks located in a predetermined position for each frame, a control film having marks positioned to register with the marks of the film, means for moving the film and means for cooperatively moving the control film, a light sensitive device, means for projecting light on said device in accordance with the registered means to energize said device, a printing mechanism for the picture subjects controlled by said device and the movement of the control film controlled by said device.

11. A selective photo-printing system comprising a film with frames having picture subjects, a plurality of rows of marks for each film, a control film having predetermined marks positioned to register with each row of the marks of the film, means for moving the film and means for cooperatively moving the control film, a light sensitive device for each row of marks, means for projecting light on said devices in accordance with the registered marks to energize said devices, a printing mechanism for the picture subjects controlled by said devices and the movement of the control film controlled by said devices.

12. A selective photo-printing system comprising a film with frames having picture subjects and a plurality of marks for each frame, a control film having marks registering with the marks of the film, means for moving the film and means for cooperatively moving the control film, means responsive to some of said registering marks for selecting a particular frame of the film, a printing mechanism for printing the picture of the selected frame and means controlled by said marks for operating the printing mechanism and for controlling the movement of the control film.

13. A selective photo-printing system comprising a film with frames having picture subjects and a plurality of marks for each frame, a control film having marks registering in size and position with the marks on the film, means for moving the film and means for cooperatively moving the control film, a light sensitive device, means for projecting light on said device in accordance with said registered marks, said device being responsive to a predetermined light value and controlling the further operation of the system and controlling the movement of the control film.

14. A selective photo-printing system comprising a film with frames having picture subjects and different marks for each frame, a drive for said film, a control or scanning film having frames with marks to register with the marks of the picture frames, means for moving said control film in cooperation with said picture film, light responsive means controlling the movement of said control film and means for projecting light beams corresponding with the registered marks of said films upon said responsive means for operating said light responsive means.

15. A selective photo-printing system comprising a film with frames having picture subjects and different marks for each frame, a projecting mechanism through which said film is fed, a scanning film having frames with marks to register with the marks of the frames of the picture film, light responsive means, means for projecting light beams corresponding with the registered marks of said films upon said light responsive means, means operatively connecting said scanning film with said projecting mechanism to move said film cooperatively with the picture film and means controlling said connecting means by said light responsive means.

16. A selective photo-printing system comprising a film with frames having picture subjects and different marks for each frame, a projecting mechanism through which said film is fed, a scanning film having frames with marks to register with the marks of the frames of the picture film, light responsive means, means for projecting light beams corresponding with the registered marks of said films upon said light responsive means, a friction drive operatively connecting said scanning film with said projecting mechanism to move said film cooperatively with the picture film and means controlling said friction drive by said light responsive means.

17. A selective photo-printing system comprising a film with frames having picture subjects and different marks for each frame, a projecting mechanism through which said film is fed, a scanning film having frames with marks to register with the marks of the frames of the picture film, light responsive means, means for projecting light beams corresponding with the registered marks of said films upon said light responsive means, a drive for said scanning film, a magnet for operatively connecting said drive with said projecting mechanism and means for controlling the circuit of said magnet by said light responsive means.

18. A selective photo-printing system comprising a film with frames having picture subjects and marks for each frame, a projecting mechanism through which said film is continuously fed, a scanning film having frames with marks to register with the marks of the frames of the picture film and normally at rest in said projecting mechanism, light responsive means, means for projecting light beams corresponding to the registered marks of said films upon said light responsive means and means controlled by said light responsive means connecting said scanning film with said mechanism to move said film cooperatively with said picture film.

19. A selective photo-printing system comprising a film with frames having picture subjects and marks for each frame, a projecting mechanism through which said film is continuously fed, a scanning film having frames with marks to register with the marks of the frames of the picture film and normally at rest in said projecting mechanism, a plurality of independent light responsive means, means for projecting light beams corresponding to the registered marks of said films upon said light responsive means and means connecting said scanning film with said mechanism to move said film, said means being controlled by said light responsive means in the energized condition.

20. A selective photo-printing system comprising a film with frames having picture subjects and marks for each frame, a projecting mechanism through which said film is continuously fed, a scanning film having frames with marks to register with the marks of the frames of the picture film and normally at rest in said projecting mechanism, light responsive means, means for projecting light beams corresponding to the registered marks of said films upon said light responsive means, a stick relay controlled by said light responsive means and means controlled by said stick relay connecting said scanning film with said mechanism to move said film.

21. A selective photo-printing system comprising a film with frames having picture subjects and marks for each frame, a projecting mechanism through which said film is continuously fed, a scanning film having frames with marks to register with the marks of the frames of the picture film and normally at rest in said projecting mechanism, light responsive means for projecting light beams corresponding to the registered marks of said films upon said light responsive means, means connecting said scanning film with said mechanism to move said film, means for initiating said connecting means by said light responsive means and means for maintaining said connection until the scanning film has moved for one frame.

22. A selective photo-printing system comprising a film with a frame having picture subjects and different marks for each frame, a projecting mechanism through which said film is fed, a scanning film having frames with marks to register with the marks of the picture film, a screen having a reflecting surface, means for projecting light beams corresponding to the registered marks upon said screen, light responsive means operated by the reflected light from said screen, means operatively connecting said scanning film with said projecting mechanism to move said film cooperatively with the picture film and means controlling said connecting means by said light responsive means.

23. A selective photo-printing system comprising a film with a frame having picture subjects and different marks for each frame, a projecting mechanism through which said film is fed, a scanning film having frames with marks to register with the marks of the picture film, light responsive means, means for projecting light beams corresponding to the registered marks of said films upon said light responsive means, a roller for moving said scanning film, a stick relay controlling said roller, said stick relay having a pick-up circuit controlled by said light responsive means and having a holding circuit controlled by the movement of said roller.

24. A selective photo-printing system comprising a film with frames having picture subjects and a row of three marks differently located for each frame, a projecting machine through which said film is fed, a scanning film having frames with three marks in a row for each frame, said marks registering with the picture film marks, a photo-electric cell, means for projecting light beams corresponding to said registered markings upon said photo cell, a circuit controlled by said photo cell, said circuit being energized only when said cell is influenced by beams of light from the three marks and means for moving said scanning film controlled by said circuit.

25. A selective photo-printing system comprising a film, a projecting machine through which said film is fed, a sensitive medium upon which the film is projected, a shutter for said medium, a photo-electric cell, means for selectively projecting light through said film upon said cell, a stick relay having a pick up circuit controlled by said cell and having a holding circuit controlled by the shutter cell and means controlling said shutter by said stick relay.

26. A selective photo-printing system comprising a film, a projecting machine through which said film is fed, a sensitive medium upon which the film is projected, a shutter for said medium, a photo-electric cell, means for selectively projecting light through said film upon said cell, a stick relay controlling said shutter, said stick relay having a pick-up circuit energized by said cell and a holding circuit controlled by the movement of the shutter.

27. A selective photo-printing system comprising a film, a projecting machine through which said film is fed, a sensitive medium upon which the film is projected, a roller for changing said medium, a shutter for said medium, a photo cell, means for selectively projecting light through said film upon said cell, a stick relay controlled by said cell and controlling said shutter and said shutter controlling said roller for changing the medium after the shutter operates.

28. A selective photo-printing system comprising a film, a projecting machine through which said film is fed, a sensitive medium upon which the film is projected, a roller for changing said medium, a shutter for said medium, a photo cell, means for selectively projecting light through said film upon said cell, a stick relay controlled by said cell and controlling said shutter, and a second stick relay controlled by said shutter and controlling said roller for changing the medium after the shutter operates.

29. A selective photo-printing system comprising a film, a projecting machine through which said film is fed, a sensitive medium upon which the film is projected, a roller for changing said medium, a scanning film registering with the picture film, means for moving said scanning film, a shutter for said medium, a photo cell, means for projecting light through said registering films upon said cell, means operated by said cell for operating said shutter and said shutter controlling said roller for changing said medium and said shutter, also controlling the moving means for said film to change the scanning film after each operation.

30. A selective photo-printing system for printing selected frames of a film comprising a projector with a sensitive medium, a film having picture frames with selective marks for each frame fed to said projector, means in said projector for matching certain marks on said film, a light responsive means, means for projecting light according to said selective marks upon said light responsive means, a roller for changing said medium, a shutter, and means for changing said selective marks, said mechanism being controlled by said light responsive means to select a predetermined frame of the picture film, to project said frame upon the medium, to operate the shutter, and to change the medium and change the selective marker in one cycle of operation.

31. A selective photo-printing system for printing selected frames of a film comprising a projector with a sensitive medium, a film having picture frames with selective marks for each frame fed to said projector, means in said projector for matching certain marks on said film, a light responsive means, means for projecting light according to said selective marks upon said light responsive means, a roller for changing said medium, a shutter, said mechanism being controlled by said light responsive means to operate said shutter, and said shutter operating said roller to change the medium in one cycle of operation.

MATTHEW H. LOUGHRIDGE.
ROBERT STUART.